(12) United States Patent
Hajredinaj et al.

(10) Patent No.: US 11,448,011 B2
(45) Date of Patent: Sep. 20, 2022

(54) INSECT PROTECTION ARRANGEMENT FOR AN OPENING IN A MOBILE VEHICLE UNIT

(71) Applicant: REMIS Gesellschaft fuer Entwicklung und Vertrieb von technischen Elementen mbH, Cologne (DE)

(72) Inventors: Semsi Hajredinaj, Duesseldorf (DE); Wolfgang Dressler, Cologne (DE)

(73) Assignee: REMIS GESELLSCHAFT FUER ENTWICKLUNG UND VERTRIEB VON TECHNISCHEN ELEMENTEN MBH, Cologne (DE)

( * ) Notice: Subject to any disclaimer, the term of this patent is extended or adjusted under 35 U.S.C. 154(b) by 0 days.

(21) Appl. No.: 17/270,049

(22) PCT Filed: Aug. 21, 2019

(86) PCT No.: PCT/EP2019/072359
§ 371 (c)(1),
(2) Date: Feb. 22, 2021

(87) PCT Pub. No.: WO2020/038991
PCT Pub. Date: Feb. 27, 2020

(65) Prior Publication Data
US 2021/0324680 A1   Oct. 21, 2021

(30) Foreign Application Priority Data
Aug. 23, 2018   (EP) .................................... 18190497

(51) Int. Cl.
*E06B 9/52* (2006.01)
*B60J 1/20* (2006.01)
(Continued)

(52) U.S. Cl.
CPC .................. *E06B 9/52* (2013.01); *B60J 1/20* (2013.01); *B60J 1/2052* (2013.01); *B60J 1/2055* (2013.01);
(Continued)

(58) Field of Classification Search
CPC ...... E06B 9/52; E06B 2009/527; E06B 9/522; E06B 9/54; E06B 2009/583; B60J 1/20;
(Continued)

(56) References Cited

U.S. PATENT DOCUMENTS

| 1,507,477 A | 9/1924 | Fraccascia |
| 1,800,627 A * | 4/1931 | Heck ..................... G03B 21/58 160/24 |

(Continued)

FOREIGN PATENT DOCUMENTS

| CN | 101336330 B * 10/2012 | ............... E06B 9/54 |
| DE | 20 2010 011 878 U1   5/2011 | |

(Continued)

*Primary Examiner* — Brent W Herring
(74) *Attorney, Agent, or Firm* — Norman B. Thot

(57) ABSTRACT

An insect protection arrangement for an opening in a mobile vehicle unit. The insect protection arrangement includes a frame arrangement having two guide rails and at least one frame strip which connects the two guide rails. The at least one frame strip has an extendable insect protection screen which is guided movably in the two guide rails. Each of the two guide rails are connected to the at least one frame strip via a rotary joint.

15 Claims, 5 Drawing Sheets

(51) Int. Cl.
  *E06B 9/54* (2006.01)
  *E06B 9/58* (2006.01)
(52) U.S. Cl.
  CPC .............. *B60J 1/2063* (2013.01); *E06B 9/522* (2013.01); *E06B 9/54* (2013.01); *E06B 2009/527* (2013.01); *E06B 2009/583* (2013.01)
(58) Field of Classification Search
  CPC ...... B60J 1/2063; B60J 1/2052; B60J 1/2055; E04F 10/0618
  USPC .................................................. 160/130, 371
  See application file for complete search history.

(56) References Cited

U.S. PATENT DOCUMENTS

| | | | | |
|---|---|---|---|---|
| 1,820,739 A * | 8/1931 | Heck | ...................... | G03B 21/58 160/240 |
| 2,094,444 A * | 9/1937 | Bozin | ........................ | E06B 9/54 160/315 |
| 2,501,454 A * | 3/1950 | Schueren | ................... | E06B 9/54 160/273.1 |
| 4,953,609 A * | 9/1990 | Annin | ..................... | G03B 21/58 160/239 |
| 5,344,206 A * | 9/1994 | Middleton | ............. | B60J 1/2025 160/271 |
| 5,597,028 A * | 1/1997 | Rolf | ........................ | B60J 1/2011 160/354 |
| 5,657,809 A * | 8/1997 | Longoria | ................... | E06B 9/04 160/160 |
| 5,671,790 A * | 9/1997 | Andersen | ................... | E06B 9/54 160/31 |
| 5,884,424 A * | 3/1999 | Smith | ...................... | G09F 11/29 40/610 |
| 6,039,107 A * | 3/2000 | Pittard | ................... | B60J 1/2063 160/24 |
| 6,367,536 B1* | 4/2002 | St Louis | ................ | B60J 1/2011 160/352 |
| 6,547,307 B2* | 4/2003 | Schlecht | ........... | H01L 21/67742 296/97.4 |
| 7,546,992 B1* | 6/2009 | Cappolina | ............ | G09F 15/0012 248/165 |
| 8,045,264 B2* | 10/2011 | Elliott | .................... | G03B 21/62 359/443 |
| 10,066,414 B2* | 9/2018 | Ma | .......................... | E04H 15/08 |
| 2005/0257899 A1* | 11/2005 | Lee | ........................... | B60P 3/36 160/98 |
| 2009/0000748 A1* | 1/2009 | Wu | ......................... | B60J 1/208 160/39 |

FOREIGN PATENT DOCUMENTS

| | | | | |
|---|---|---|---|---|
| EP | 2 128 374 A2 | 12/2009 | | |
| EP | 2 497 893 A1 | 9/2012 | | |
| EP | 2 530 236 A2 | 12/2012 | | |
| EP | 2 599 948 A1 | 6/2013 | | |
| EP | 2990245 A1 * | 3/2016 | ........... | B60J 5/0494 |
| KR | 102184997 B1 * | 12/2020 | | |

\* cited by examiner

INSECT PROTECTION ARRANGEMENT FOR AN OPENING IN A MOBILE VEHICLE UNIT

CROSS REFERENCE TO PRIOR APPLICATIONS

This application is a U.S. National Phase application under 35 U.S.C. § 371 of International Application No. PCT/EP2019/072359, filed on Aug. 21, 2019 and which claims benefit to European Patent Application No. 18190497.0, filed on Aug. 23, 2018. The International Application was published in German on Feb. 27, 2020 as WO 2020/038991 A1 under PCT Article 21(2).

FIELD

The present invention relates to an insect protection arrangement for an opening in a mobile vehicle unit, such as a camper van, a caravan etc., the insect protection arrangement comprising a frame arrangement with two guide rails and at least one frame strip connecting the guide rails, wherein the at least one frame strip is provided with an extendable insect protection grid which is guided movably in the guide rails. With habitable mobile vehicle units, for example, camper vans or caravans, it is desired to provide door or window openings with insect protection arrangements in order to protect the vehicle interior against intruding insects when doors or windows are open. These insect protection arrangements should be designed so that they do not interfere with the opening or closing of a door or window. Openings should also be easy to retrofit with such insect protection arrangements since the vehicle units are usually not equipped with such an insect protection arrangement.

BACKGROUND

A generic insect protection arrangement was previously described in German Utility Model DE 20 2010 011 878 U1 which can be used in mobile vehicle units for protection from intruding insects when doors or windows are open. This insect protection arrangement has a drawback, however, in that the frame arrangement is intricate to mount by a user or by an automotive garage. A completely preassembled frame arrangement is disadvantageous in that it can be shipped only with great effort, entailing high costs.

SUMMARY

An aspect of the present invention is to provide an insect protection arrangement which avoids the above-mentioned disadvantages in a simple and cost-effective manner.

In an embodiment, the present invention provides an insect protection arrangement for an opening in a mobile vehicle unit. The insect protection arrangement includes a frame arrangement comprising two guide rails and at least one frame strip which is configured to connect the two guide rails. The at least one frame strip comprises an extendable insect protection screen which is guided movably in the two guide rails. Each of the two guide rails are connected to the at least one frame strip via a rotary joint

BRIEF DESCRIPTION OF THE DRAWINGS

The present invention is described in greater detail below on the basis of embodiments and of the drawings in which.

DETAILED DESCRIPTION

Figure 1:
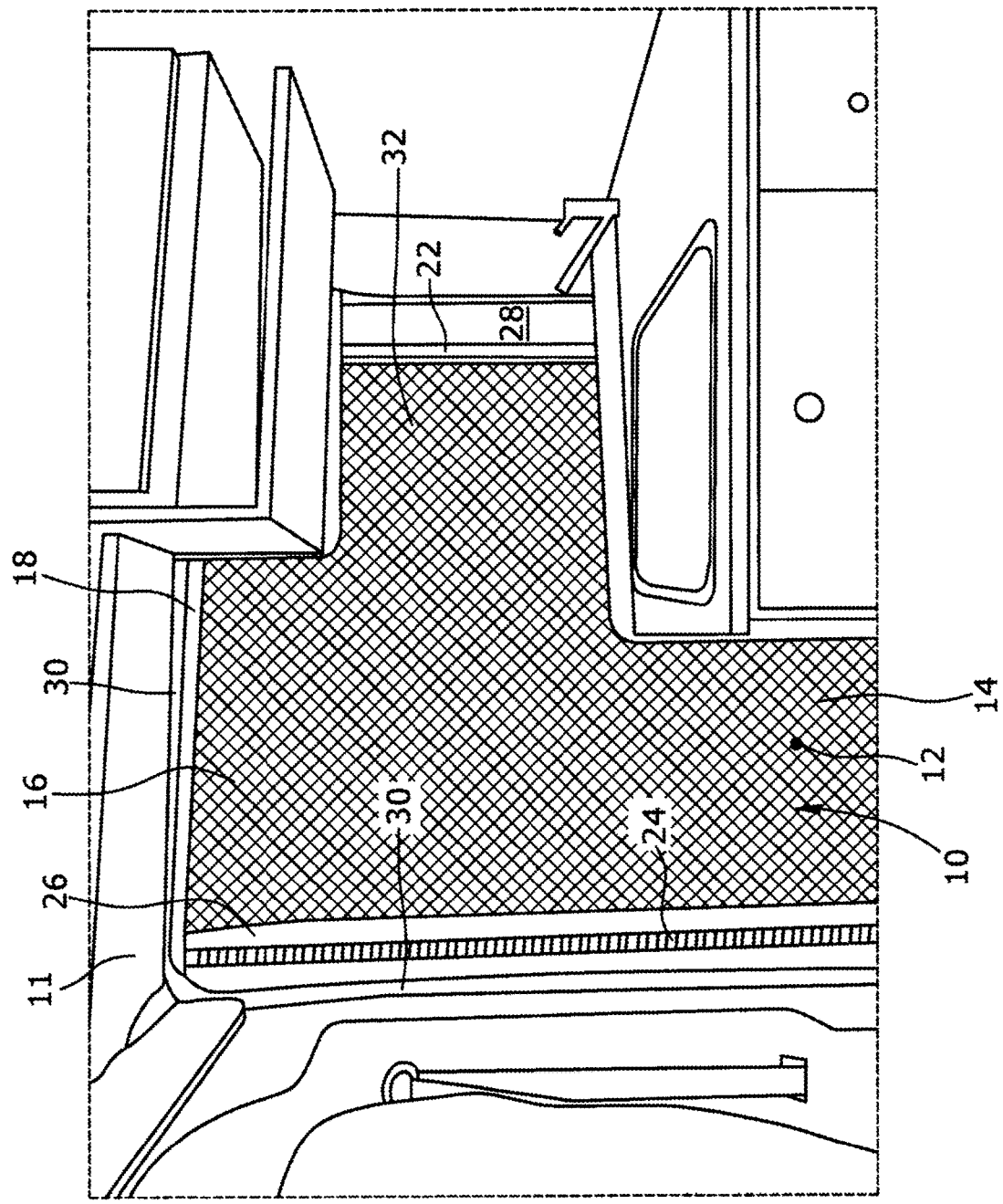
FIG. 1 shows a perspective view of an insect protection arrangement as seen from a vehicle interior.

The present invention provides that the guide rails are each connected with the at least one frame strip by a rotary joint. The insect protection arrangement, and in particular the frame arrangement, can thereby be easily and safely transported in a folded state. A consumer or a mechanic in an automotive garage must merely unfold the frame arrangement to mount the pre-configured insect protection arrangement in a respective vehicle in a manner known per se.

In a particularly advantageous manner at least one guide rail comprises a locking arrangement for connection with the at least one frame strip. It can thereby be provided that at least the one guide strip to be locked extends under a desired angle to the frame strip, typically a right angle. The locking arrangement may here comprise a click connection. In a particularly advantageous manner, the locking arrangement has a pin element which is arranged to be movable in the guide rail or in the at least one frame strip, which pin element, when in a pulled-out position, allows the rotary joint to be rotated. In a particularly advantageous manner, in order to provide additional safeguarding during transport and also in the unfolded state, the pin element may be movably supported in the guide rail or in the at least one frame strip while being pretensioned by a spring element.

In an advantageous manner, a blocking device for the insect protection screen is provided in the guide rails. This provides that the insect protection screen can be blocked in any movement position. In a particularly advantageous manner, the blocking device is configured as a cord brake. A cord of the cord brake can here be passed through the rotary joint while being spring-loaded by a spring element. It is thus possible to adapt the cord brake to the configured insect protection arrangement and to compensate for the length change due to the process of folding up or out.

In a particularly advantageous embodiment, the two guide rails are designed as upper and lower guide rails running in the longitudinal direction of the vehicle. It is thereby possible, in particular when mounted in a door opening, to move the insect protection screen only in part so as to allow a person to enter the vehicle interior. It is then also advantageous in such an arrangement to provide at least the lower guide rail with a locking arrangement to provide a correct installation with respect to the vehicle body.

In a particularly advantageous manner, a second frame strip is provided in the opening, which second frame strip cooperates with the insect protection screen in a sealing manner. This second frame strip is not an integrated part of the frame arrangement, but should connect neatly to the guide strips for design reasons. It is here advantageous if the second frame strip is designed to be pivotable about a vertical axis or as a brush so as to not interfere with the closing of the door or the window.

In a particularly advantageous manner, the insect protection screen may have a handle strip on its side averted from the first frame strip in order to allow the user to move the insect protection screen in a simple manner and to provide a perfect abutment on the second frame strip.

The first frame strip may be provided with a housing cassette for receiving the insect protection screen for storing the insect protection screen in the open state or during transport.

The present invention will be explained in greater detail below under reference to the drawings.

FIG. 1 is a perspective view illustrating an insect protection arrangement 10 according to the present invention for a vehicle unit 11 which is designed as a caravan, the vehicle unit 11 having an opening 12 which is designed as a door opening which is closed by an insect protection screen 14. For this purpose, the insect protection arrangement 10 comprises a frame arrangement 16 with a first, upper guide rail 18, a second, lower guide rail 20 (see FIG. 2), and a first frame strip 22 which connects the two guide rails 18, 20. A second frame strip 24 is also provided which in the present embodiment is designed as a brush on which a handle strip 26 of the insect protection screen 14 abuts in a sealing manner. The insect protection arrangement 10 also comprises a housing cassette 28 provided on the first frame strip 22 which securely receives the insect protection screen 14 in the rolled-up or folded-up state. The insect protection arrangement 10 is fastened in a manner known per se to a door seal 30 of a vehicle body for a vehicle door 32 covered by the insect protection screen 14.

Figure 2:
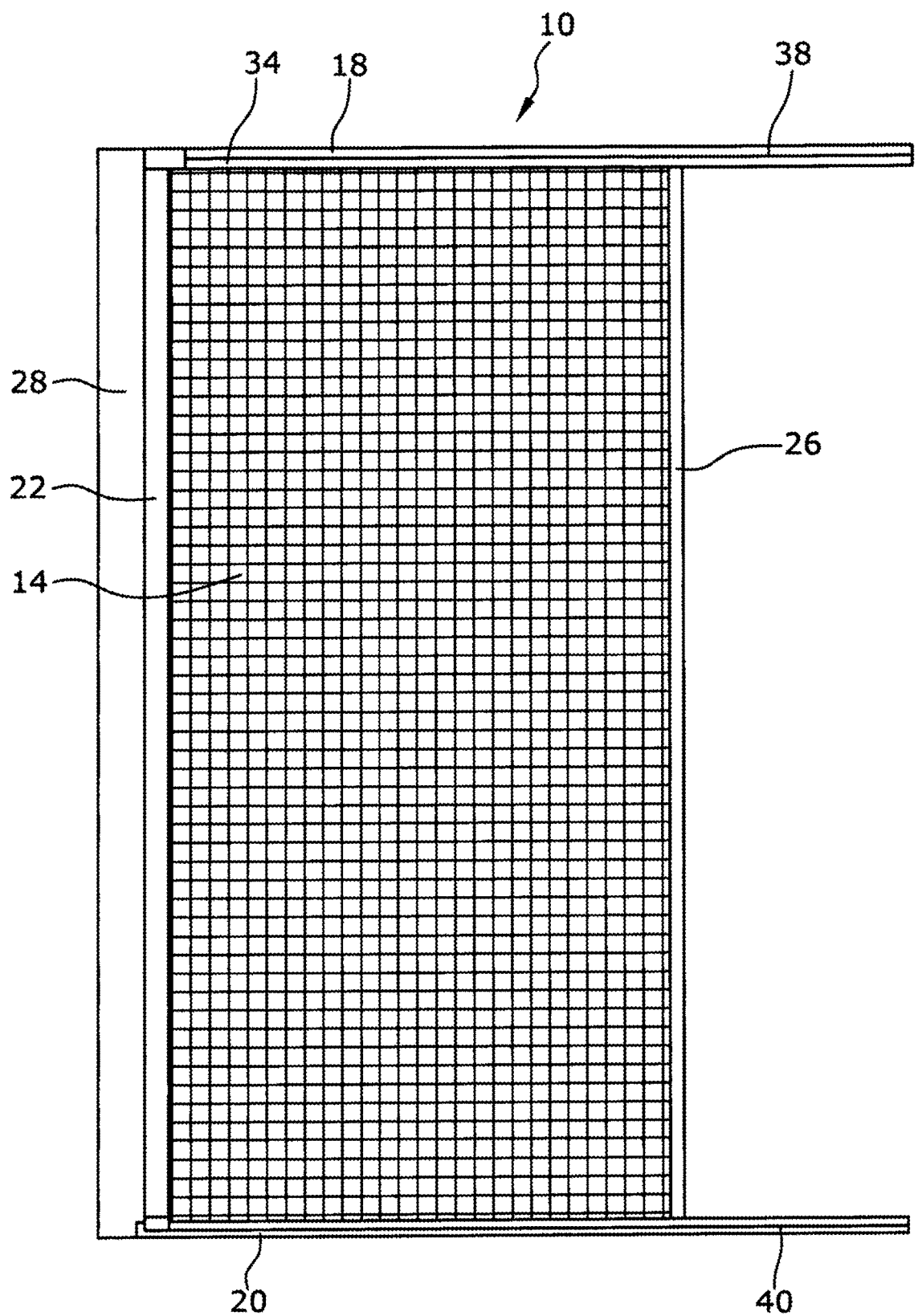
FIG. 2 shows a top plan view of the insect protection arrangement of FIG. 1 in a non-installed state.

FIG. 2 shows the insect protection screen arrangement 10 in a top plan view in a non-installed state. The guide rails 18, 20 are here hinged to the first frame strip 22 via schematically indicated rotary joints 34, 36. It is thereby particularly simple to safely ship the insect protection screen arrangement 10 configured for a respective vehicle to an automotive garage or to a customer in a folded state. The mechanic or customer must then only unfold the guide rails 18, 20 and mount the insect protection screen arrangement 10 to the vehicle unit 11 in a manner know per se.

The insect protection screen 14 can be locked in any desired position via a stepless blocking arrangement 38, 40 arranged in the respective guide rails 18, 20. The stepless blocking arrangement 38, 40 in the present embodiment is configured as a schematically indicated cord brake which is know per se. A cord of the cord brake 38, 40 is here passed through the rotary joint 34, 36 while being spring-loaded by a spring element (which is not illustrated), whereby the cord brake 38, 40 can be adjusted ready for use when the insect protection screen arrangement 10 is manufactured and can compensate for a length change during the process of folding up or out to be described below.

Figure 3:
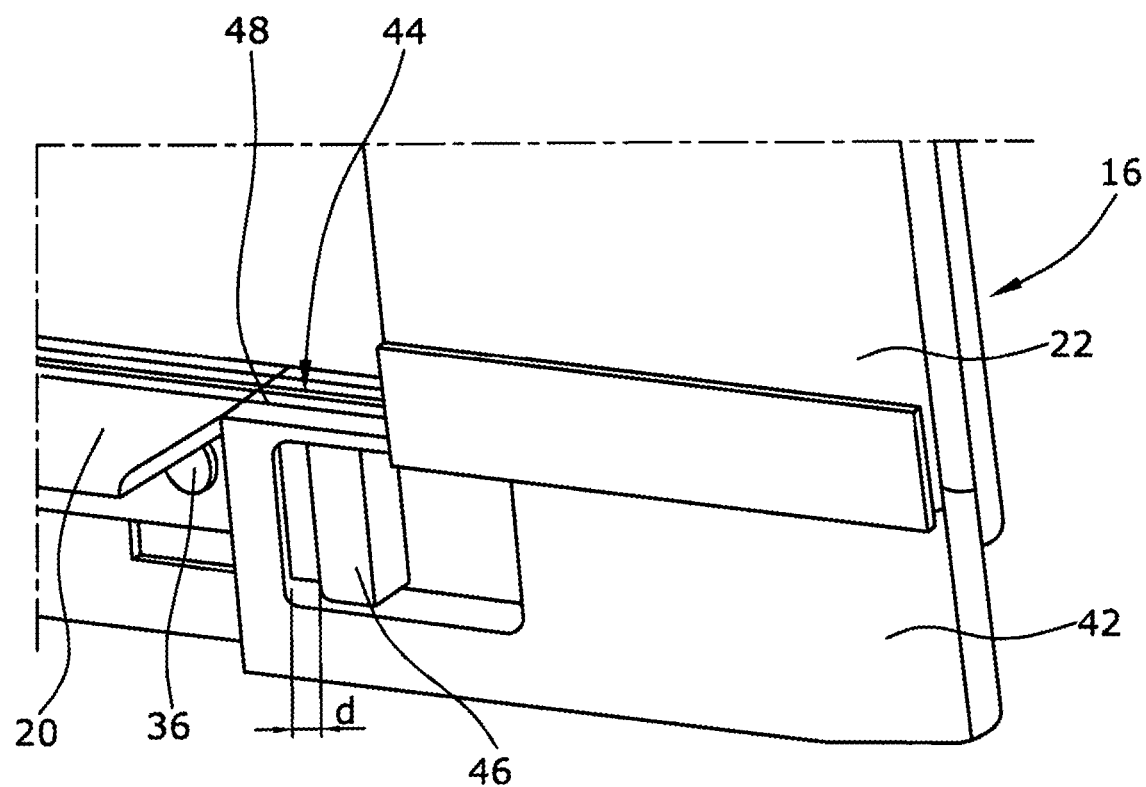
FIG. 3 shows a detail view of a frame arrangement with a second guide rail in a folded out position.
Figure 4:
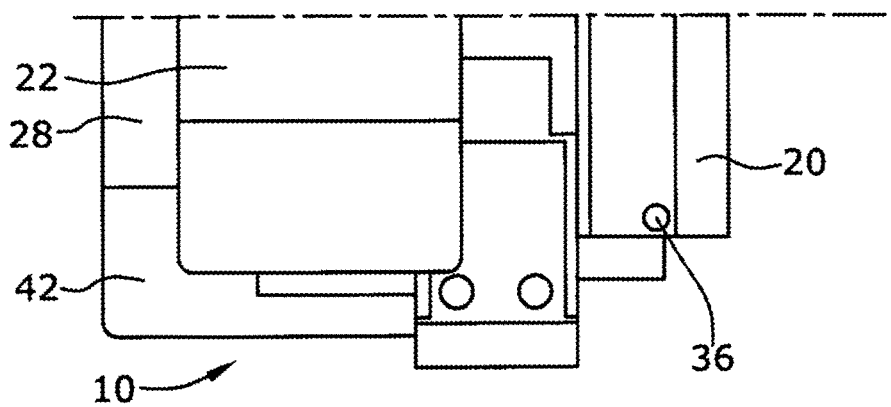
FIG. 4 shows a first detailed view of the frame arrangement in FIG. 3 with a first position of the second guide rail.

FIG. 3 illustrates a detail of the frame arrangement 16 again with a side facing the interior of the vehicle unit 11 in the mounted state. The first frame strip 22 comprises a first frame cassette 42 which in the present embodiment is part of a locking device 44. The locking device 44 further comprises a pin element 46 supported in the first frame cassette 42 so as to be displaceable by a distance d. The lower guide rail 20 is connected with the pin element 46 via the rotary hinge 36. In the illustrated position, no rotation of the guide rail 20 is possible with respect to the first frame strip 22 since the guide rail 20 is blocked by an edge 48 of the first frame cassette 42. To allow for a rotary movement, the guide rail 20 must be displaced by the distance d. This process will be explained in more detail with reference to FIGS. 4 to 7. In this embodiment, in order to secure the guide rail 20 against unintentional unfolding both in the folded up and the unfolded state, in particular when in the non-installed state, a spring element (which is not illustrated in detail) can act upon the pin element 46 so as to pretension the pin element 46.

Figure 5:
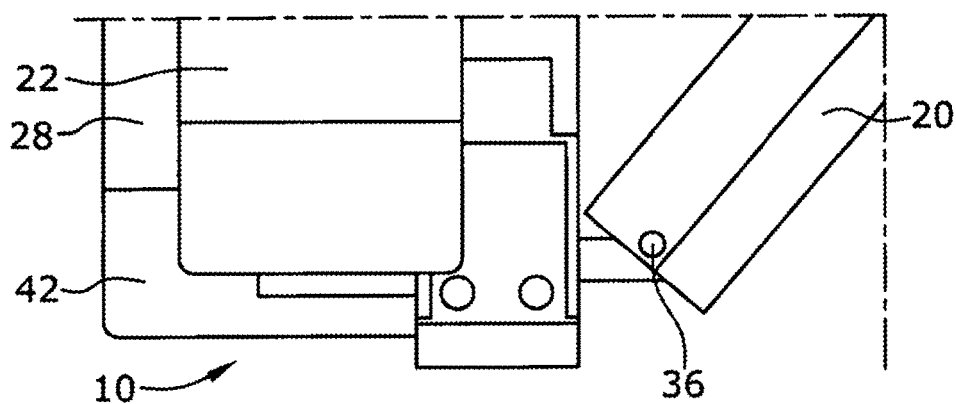
FIG. 5 shows a second detailed view of the frame arrangement in FIG. 3 with a second position of the second guide rail.
Figure 6:
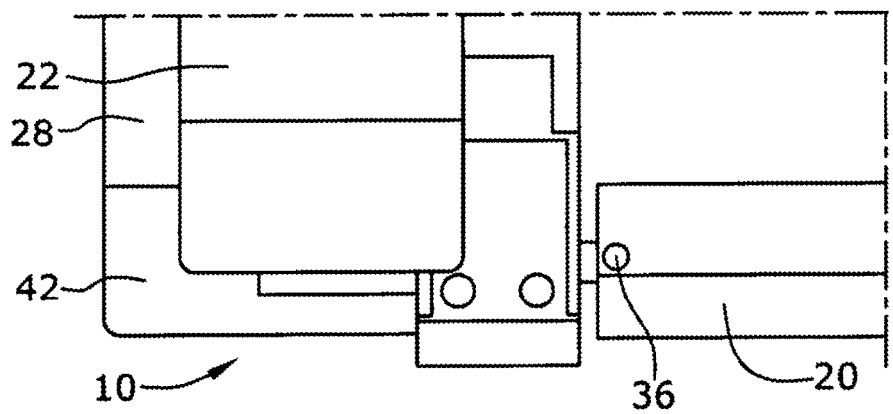
FIG. 6 shows a third detailed view of the frame arrangement in FIG. 3 with a third position of the second guide rail.
Figure 7:
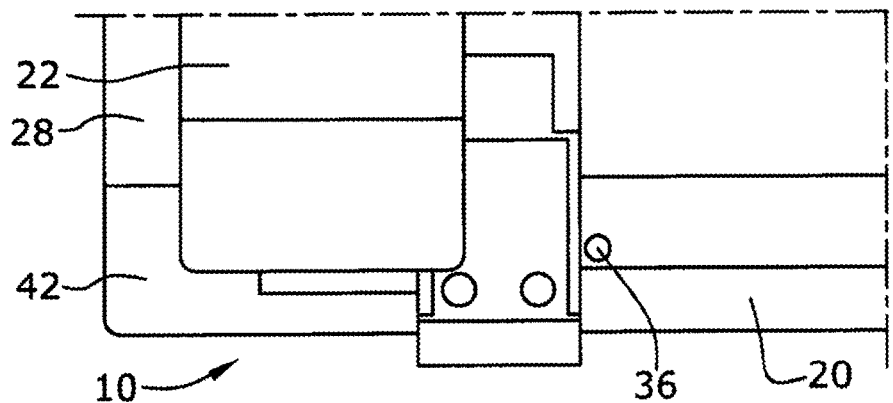
FIG. 7 shows a fourth detailed view of the frame arrangement in FIG. 3 with a fourth position of the second guide rail.
Figure 8:
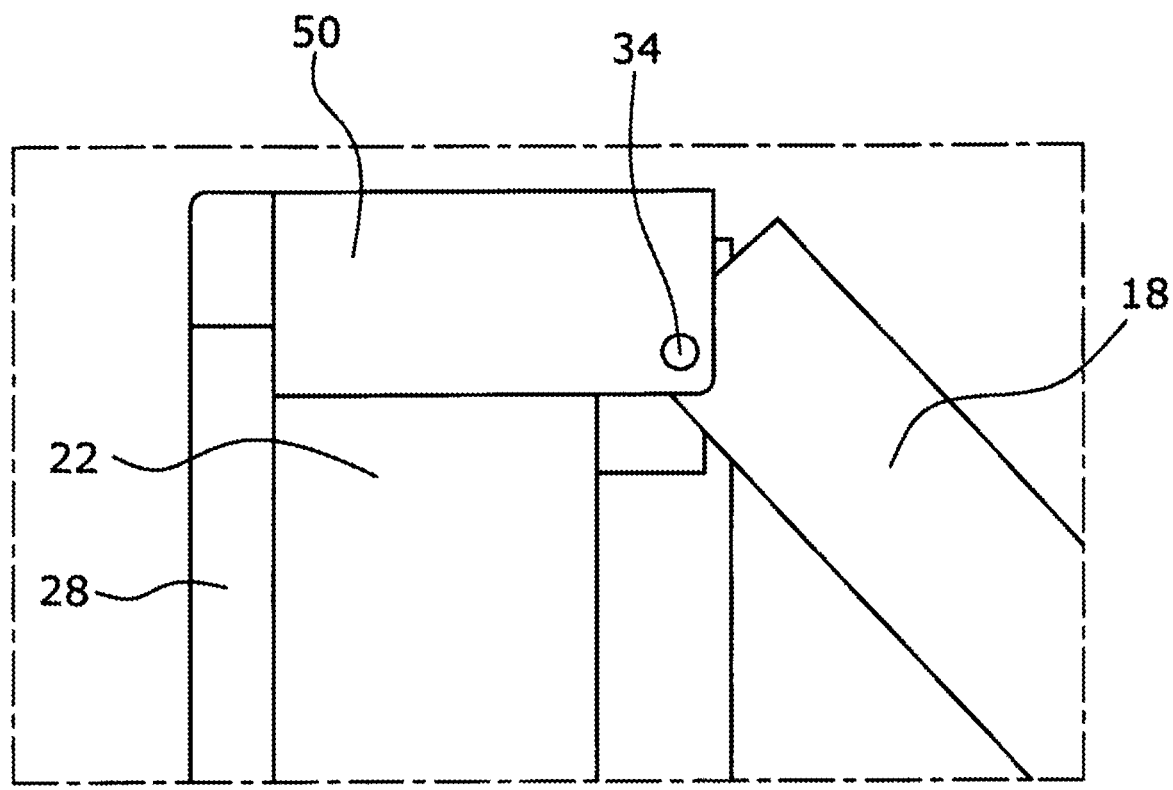
FIG. 8 shows a detail view of the frame arrangement in the region of a first guide rail.

FIGS. 4 to 7 illustrate the lower frame of the insect protection arrangement 10 in the region of the rotary joint 36, first in a state in which the guide rail 20 is folded up. The view is here from the side opposite to that in FIG. 3. The insect protection screen arrangement 10 is shipped to a garage or the customer in this folded-up state in which the insect protection screen arrangement 14 is stored in the housing cassette 28. To transition the frame arrangement to a state that allows for a simple mounting of the insect protection arrangement 10, the guide rail 20 is pivoted downward, as is illustrated in FIG. 5. FIG. 6 illustrates the position of the guide rail 20 with the pin element 46 extended, and FIG. 7 shows the final position with the guide rail 20 fixed. The upper guide rail 18 is transitioned to an unfolded state in a similar manner as is illustrated in FIG. 8. FIG. 8 only illustrates the intermediate step with the guide rail 18 slightly pivoted. The guide rail 18 is here not connected with the first frame strip 22 by a locking device 44 so as to allow for an easy compensation of tolerances in a simple manner. A second frame cassette 50 is again provided to cover the rotary joint 34, which is illustrated as being concealed.

The present invention is not limited to embodiments described herein; reference should be had to the appended claims.

What is claimed is:

1. An insect protection arrangement for an opening in a mobile vehicle unit, the insect protection arrangement comprising:
   a frame arrangement comprising two guide rails and at least one frame strip which is configured to connect the two guide rails, the at least one frame strip comprising an extendable insect protection screen which is guided movably in the two guide rails,
   wherein,
   each of the two guide rails are connected to the at least one frame strip via a rotary joint,
   the two guide rails are provided as an upper guide rail and as a lower guide rail each of which extend in a longitudinal direction of the mobile vehicle unit, the upper guide rail and the lower guide rail being configured so that, when the extendable insect protection arrangement is mounted in a door opening of the mobile vehicle unit, that the insect protection screen is also movable only in part so as to allow a person to enter an interior of the mobile vehicle unit,
   at least one of the two guide rails comprises a locking arrangement which is configured to connect with the at least one frame strip, and
   the locking arrangement is provided as a non-frictional locking device.

2. The insect protection arrangement as recited in claim 1, wherein the locking arrangement is configured so that the respective at least one of the two guide rails be locked extends at a right angle to the at least one frame strip.

3. The insect protection arrangement as recited in claim 1, wherein the locking arrangement comprises a click connection.

4. The insect protection arrangement as recited in claim 1, wherein the locking arrangement comprises a pin element which is movably supported in the at least one of the two guide rails or in the at least one frame strip so that, in a pulled-out position, the pin element allows for a rotation of the rotary joint.

5. The insect protection arrangement as recited in claim 4, further comprising:
a spring element,
wherein,
the pin element is movably supported in the at least one of the two guide rails or in the at least one frame strip under a pretension of the spring element.

6. The insect protection arrangement as recited in claim 5, wherein each of the two guide rails comprises a blocking arrangement for the insect protection screen.

7. The insect protection arrangement as recited in claim 6, wherein the blocking arrangement is designed as a cord brake.

8. The insect protection arrangement as recited in claim 7, wherein,
the cord brake comprises a cord, and
the cord of the cord brake is passed through the rotary joint while being pretensioned by the spring element.

9. The insect protection arrangement as recited in claim 1, further comprising:
a second frame strip arranged in the opening, the second frame strip being configured to cooperate with the insect protection screen in a sealing manner.

10. The insect protection arrangement as recited in claim 9, wherein the second frame strip is further configured to be pivotable about a vertical axis or as a brush.

11. The insect protection arrangement as recited in claim 1, wherein the extendable insect protection screen comprises a handle strip on a side which is averted from the at least one frame strip.

12. The insect protection arrangement as recited in claim 1, wherein the at least one frame strip comprises a housing cassette for receiving the extendable insect protection screen.

13. The insect protection arrangement as recited in claim 1, wherein the mobile vehicle unit is a camper van or a caravan.

14. An insect protection arrangement for an opening in a mobile vehicle unit, the insect protection arrangement comprising:
a frame arrangement comprising two guide rails and at least one frame strip which is configured to connect the two guide rails, the at least one frame strip comprising an extendable insect protection screen which is guided movably in the two guide rails,
wherein,
each of the two guide rails are connected to the at least one frame strip via a rotary joint, and
each of the two guide rails comprises a blocking arrangement for the insect protection screen, the blocking arrangement being designed as a cord brake which comprises a cord which is passed through the rotary joint while being pretensioned by a spring element.

15. An insect protection arrangement for an opening in a mobile vehicle unit, the insect protection arrangement comprising:
a frame arrangement comprising two guide rails and at least one frame strip which is configured to connect the two guide rails, the at least one frame strip comprising an extendable insect protection screen which is guided movably in the two guide rails; and
a spring element,
wherein,
each of the two guide rails are connected to the at least one frame strip via a rotary joint,
the two guide rails are provided as an upper guide rail and as a lower guide rail each of which extend in a longitudinal direction of the mobile vehicle unit, the upper guide rail and the lower guide rail being configured so that, when the extendable insect protection arrangement is mounted in a door opening of the mobile vehicle unit, that the insect protection screen is also movable only in part so as to allow a person to enter an interior of the mobile vehicle unit,
at least one of the two guide rails comprises a locking arrangement which is configured to connect with the at least one frame strip,
the locking arrangement comprises a pin element which is movably supported in the at least one of the two guide rails or in the at least one frame strip so that, in a pulled-out position, the pin element allows for a rotation of the rotary joint,
the pin element is movably supported in the at least one of the two guide rails or in the at least one frame strip under a pretension of the spring element,
each of the two guide rails comprises a blocking arrangement for the insect protection screen,
the blocking arrangement is designed as a cord brake which comprises a cord, and
the cord of the cord brake is passed through the rotary joint while being pretensioned by the spring element.

* * * * *